United States Patent
Boedicker

(10) Patent No.: US 9,927,128 B2
(45) Date of Patent: Mar. 27, 2018

(54) METHOD FOR OPERATING AN OVEN APPLIANCE AND A CONTROL SYSTEM FOR AN OVEN APPLIANCE

(71) Applicant: General Electric Company, Schenectady, NY (US)

(72) Inventor: Stephen Christopher Boedicker, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 587 days.

(21) Appl. No.: 14/309,029

(22) Filed: Jun. 19, 2014

(65) Prior Publication Data
US 2015/0370267 A1    Dec. 24, 2015

(51) Int. Cl.
*G05D 23/01* (2006.01)
*F24C 7/08* (2006.01)
*G05D 23/19* (2006.01)

(52) U.S. Cl.
CPC .......... *F24C 7/087* (2013.01); *G05D 23/1904* (2013.01)

(58) Field of Classification Search
CPC .................. F24C 7/087; G05D 23/1904
USPC ........ 432/1, 4, 18; 126/4, 19 R, 20.2, 273 R, 126/275 E; 219/413, 610
See application file for complete search history.

(56) References Cited

U.S. PATENT DOCUMENTS

| | | | |
|---|---|---|---|
| 2,701,610 A | 2/1955 | Carlson | |
| 6,355,914 B1* | 3/2002 | Stockley | A47J 37/0623 219/398 |
| 6,570,136 B1* | 5/2003 | Lockwood | F24C 7/082 219/398 |
| 7,527,495 B2 | 5/2009 | Yam et al. | |
| 7,750,271 B2* | 7/2010 | Smith | F24C 7/08 219/391 |
| 2003/0015518 A1* | 1/2003 | Baker | F24C 7/087 219/486 |

* cited by examiner

*Primary Examiner* — Alissa Tompkins
*Assistant Examiner* — Benjamin W Johnson
(74) *Attorney, Agent, or Firm* — Dority & Manning, P.A.

(57) ABSTRACT

A method for operating an oven appliance includes establishing a set temperature, operating a heating element of the oven appliance in order to heat a cooking chamber of the oven appliance to a target temperature with the heating element, and continually reducing the target temperature to the set temperature. A related control system for an oven appliance is also provided.

6 Claims, 6 Drawing Sheets

METHOD FOR OPERATING AN OVEN APPLIANCE AND A CONTROL SYSTEM FOR AN OVEN APPLIANCE

FIELD OF THE INVENTION

The present subject matter relates generally to oven appliances.

BACKGROUND OF THE INVENTION

Oven appliances generally include a cabinet that defines a cooking chamber for receipt of food items for cooking Heating elements are positioned within the cooking chamber to heat food items located therein. The heating elements can include a bake heating element positioned at a bottom of the cooking chamber and/or a broil heating element positioned at a top of the cooking chamber.

Generally, oven appliances are preheated prior to inserting food items into the appliance's cooking chamber. Such preheating can be necessary to heat the oven appliance's walls, doors, and other exposed surfaces and bring the oven appliance up to a steady-state operating temperature while balancing consumer expectations for preheat time, Prior to reaching the steady-state operating temperature, radiant heat transfer from such components can be insufficient or unsuitable to properly cook short run food items within the cooking chamber.

When preheating is complete and food items are placed within the cooking chamber, the oven appliance's controls may have no call for heat because of differences in heat input between preheat and cook modes and the impact on the oven temperature sensor. Thus, the oven appliance's heating elements may be deactivated for a period of time immediately after preheating is complete. When dealing with short bake foods, deactivating the heating elements immediately after preheating is finished can negatively affect cooking performance. In particular, decreased calls for heat over an initial cooking time of such food items can lead to incomplete cooking and longer cook times.

Accordingly, a method for operating an oven appliance that assists with cooking food items after exiting a preheat cycle of the oven appliance would be useful. In particular, a method for operating an oven appliance that assists with evenly and/or uniformly cooking food items immediately after a preheat cycle of the oven appliance would be useful.

BRIEF DESCRIPTION OF THE INVENTION

The present subject matter provides a method for operating an oven appliance. The method includes establishing a set temperature, operating a heating element of the oven appliance in order to heat a cooking chamber of the oven appliance to a target temperature with the heating element, and continually reducing the target temperature to the set temperature. A related control system for an oven appliance is also provided. Additional aspects and advantages of the invention will be set forth in part in the following description, or may be apparent from the description, or may be learned through practice of the invention.

In a first exemplary embodiment, a method for operating an oven appliance is provided. The method includes establishing a set temperature for a cooking operation of the oven appliance, determining a preheating cycle exit temperature for the cooking operation of the oven appliance based at least in part on the set temperature, initiating a preheating cycle of the oven appliance, operating heating elements of the oven appliance during the preheating cycle in order to heat the cooking chamber of the oven appliance to the preheating cycle exit temperature with the heating elements with the preheating cycle exit temperature being greater than the set temperature, and continually reducing a target temperature of the oven appliance to the set temperature after a temperature of the cooking chamber exceeds the preheating cycle exit temperature.

In a second exemplary embodiment, a method for operating an oven appliance is provided. The method includes establishing a set temperature for a cooking operation of the oven appliance, initiating a preheating cycle of the oven appliance, operating a heating element of the oven appliance during the preheating cycle in order to heat the cooking chamber of the oven appliance to a target temperature with the heating element where the target temperature is greater than the set temperature during the preheating cycle, initiating a transition cycle of the oven appliance, continually reducing the target temperature to the set temperature during the transition cycle, and operating the heating element of the oven appliance during the transition cycle in order to heat the cooking chamber of the oven appliance to the target temperature with the heating element.

In a third exemplary embodiment, a control system for an oven appliance is provided. The oven appliance has a cabinet that defines a cooking chamber and a heating element positioned at the cooking chamber of the cabinet. The control system includes a temperature sensor positioned at the cooking chamber and configured to detect an air temperature within the cooking chamber. The control system also includes a user interface and a controller. The controller is operatively coupled to the temperature sensor and the user interface. The controller includes a memory in communication with a processor. The memory includes program instructions for execution by the processor to: receive a set temperature for a cooking operation of the oven appliance from the user interface; initiate a preheating cycle of the oven appliance; operate the heating element of the oven appliance during the preheating cycle in order to heat the cooking chamber to a target temperature with the heating element where the target temperature is greater than the set temperature during the preheating cycle; initiate a transition cycle of the oven appliance; continually reduce the target temperature to the set temperature during the transition cycle; and operate the heating element of the oven appliance during the transition cycle in order to heat the cooking chamber to the target temperature with the heating element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
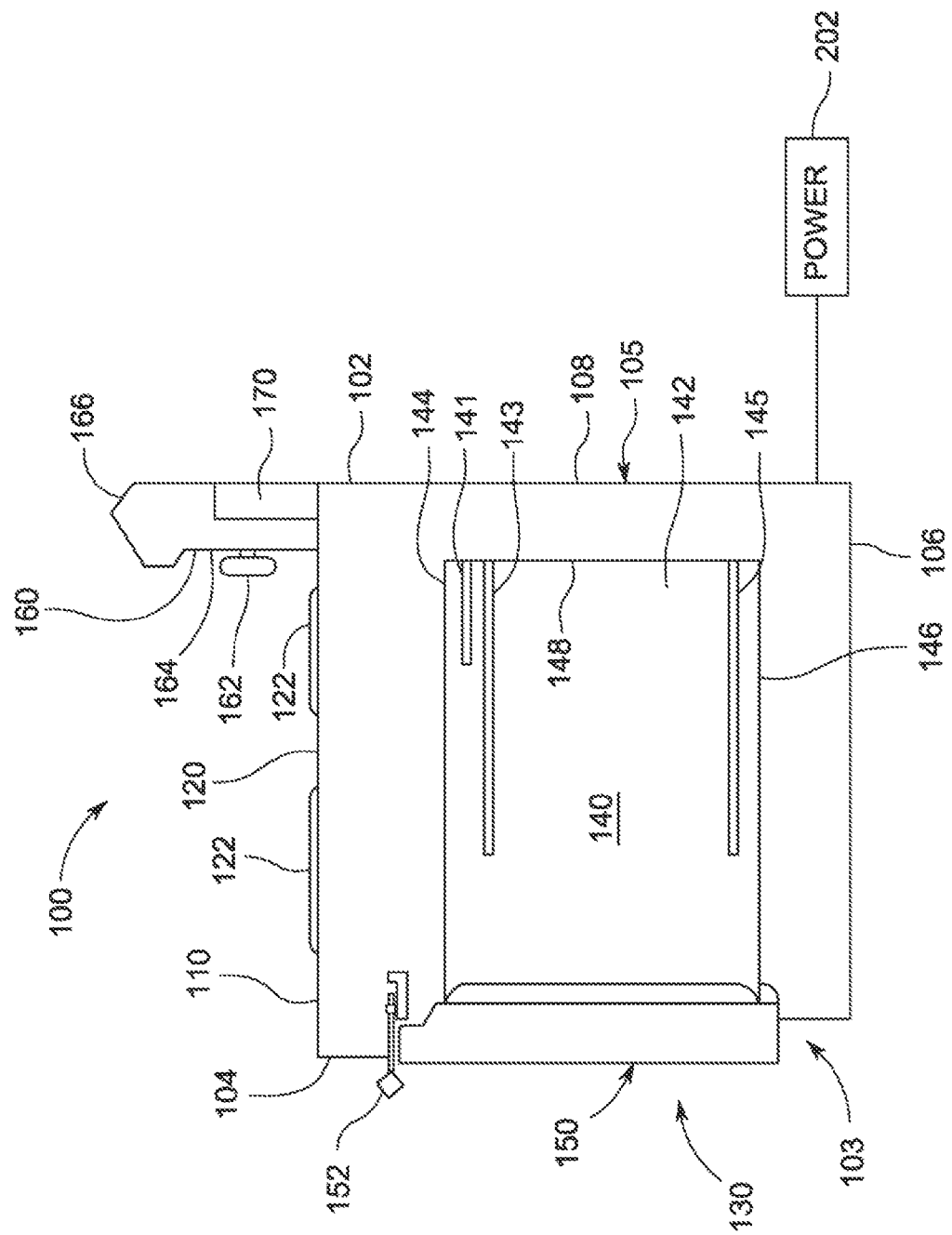
FIG. 1 provides a cut-away side view of a range appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a cut-away side view of a range appliance 100 according to an exemplary embodiment of the present subject matter. As is shown in FIG. 1, the range appliance 100 is generally in the form of a single oven, free-standing range appliance. However, it should be understood that the present subject matter may be used in or with any suitable oven appliance, such as a single wall oven, a double wall oven, a double oven range appliance, a convection oven, etc. Range appliance 100 includes a cabinet or housing 102 that has a front portion 104, a bottom portion 106, a back portion 108, a top portion 110, and opposing side portions 103, 105, only one of which is shown.

In the embodiment shown in FIG. 1, a cooking surface 120 on top portion 110 of range appliance 100 includes heating elements 122, such as electric resistance heating elements, gas burners, induction heating elements, etc. Positioned within housing 102 of range appliance 100 is a cooking chamber or cavity 140 formed by a box-like oven liner having vertical side walls 142, a top wall 144, bottom wall 146, rear wall 148 and a front opening door 150. Door 150 of oven portion 130 can generally be pivoted between an open and closed position in a manner generally known. A door latch 152 can be used for locking door 150 in a closed position.

In the exemplary embodiment shown in FIG. 1, cavity 140 is provided with two heat sources or heating elements 143, 145. However, as noted above, the present subject matter may be used in oven appliances having a cavity 140 with more than two heating sources or elements or a single heating source or element in alternative exemplary embodiments. In FIG. 1, a bake heating element 143 is positioned adjacent bottom wall 146 and a broil heating element 145 is positioned adjacent top wall 144. In the embodiment shown in FIG. 1, heating elements 143, 145 are electrically powered heating elements and may include either the traditional sheathed resistance heating element or a quartz-enclosed element. In alternate exemplary embodiments, heating elements 143, 145 may comprise gas powered heating elements. When a gas powered heating element is utilized, an electrically-controlled gas valve (not shown) to control the gas flow rate may be implemented or utilized. The gas-flow control valve or solenoid will provide a substantially continuous range of gas-flow rates controlled by an electrical signal supplied by oven controller 170.

A temperature probe or sensor 141 is disposed within cavity 140. In the example shown in FIG. 1, sensor 141 is configured to project into cavity 140 between broil heating element 143 and top wall 144. However, in alternate embodiments, temperature sensor 141 can be disposed at any suitable location within cavity 140, such as for example, on top wall 144 or either of side walls 142. In one embodiment, oven portion 130 can include more than one sensor 141, disposed along any suitable locations of cavity 140. In yet another alternative exemplary embodiments, temperature sensor 141 may be attached to a surface of one or more of walls 142, 144, 146, 148 either on a surface within cavity 140 or a wall surface on the insulation side (not shown) of cavity 140. In such exemplary embodiments, sensor 141 measures the temperature of the cavity wall surface, which is then used as a measure of oven air temperature within cavity 140.

Cabinet 102 also includes a control panel or user interface 160 that supports control knobs, such as knob 162, or other suitable controls (e.g. touch-pad), for regulating heating elements 122. Control panel 160 can also include a central control and display unit 164. Control panel 160 is generally configured to allow the user to set and adjust certain functions of range appliance 100, including, but not limited to a cooking mode and a cooking temperature. Control panel 160 and control knob 162 can be supported by a back splash 166 of the range appliance 100.

In one embodiment, range appliance 100 includes an oven controller 170. Oven controller 170 is generally configured to control the operation of range appliance 100 and oven portion 130. Oven controller 170 is operatively coupled to the sensor 141 for receiving signals representative of the detected temperature of cavity 140 from sensor 141. Oven controller 170 is also operatively coupled to heating elements 143, 145 and power source 202 for selectively controlling the operation of each of heating elements 143, 145. Control panel 160 and control knob 164 can be used to provide inputs, commands and instructions to oven controller 170, such as for example, the selection of a desired oven cavity temperature set point. Oven controller 170 may be positioned in a variety of locations throughout range appliance 100. Input/output ("I/O") signals may be routed between oven controller 170 and various operational components of range appliance 100 along wiring harnesses that may be routed through cabinet 102.

Oven controller 170 may include a memory and microprocessor, such as a general or special purpose microprocessor operable to execute programming instructions or micro-control code associated with operating cycles of range appliance 100. Thus, processors of oven controller 170 may be operable to process inputs, commands and instructions to control the operation of heating elements 143, 145, as is further described herein. The memory may represent random access memory such as DRAM, or read only memory such as ROM or FLASH. In one embodiment, the processor executes programming instructions stored in memory. The memory may be a separate component from the processor or may be included onboard within the processor. Alternatively, oven controller 170 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 2:
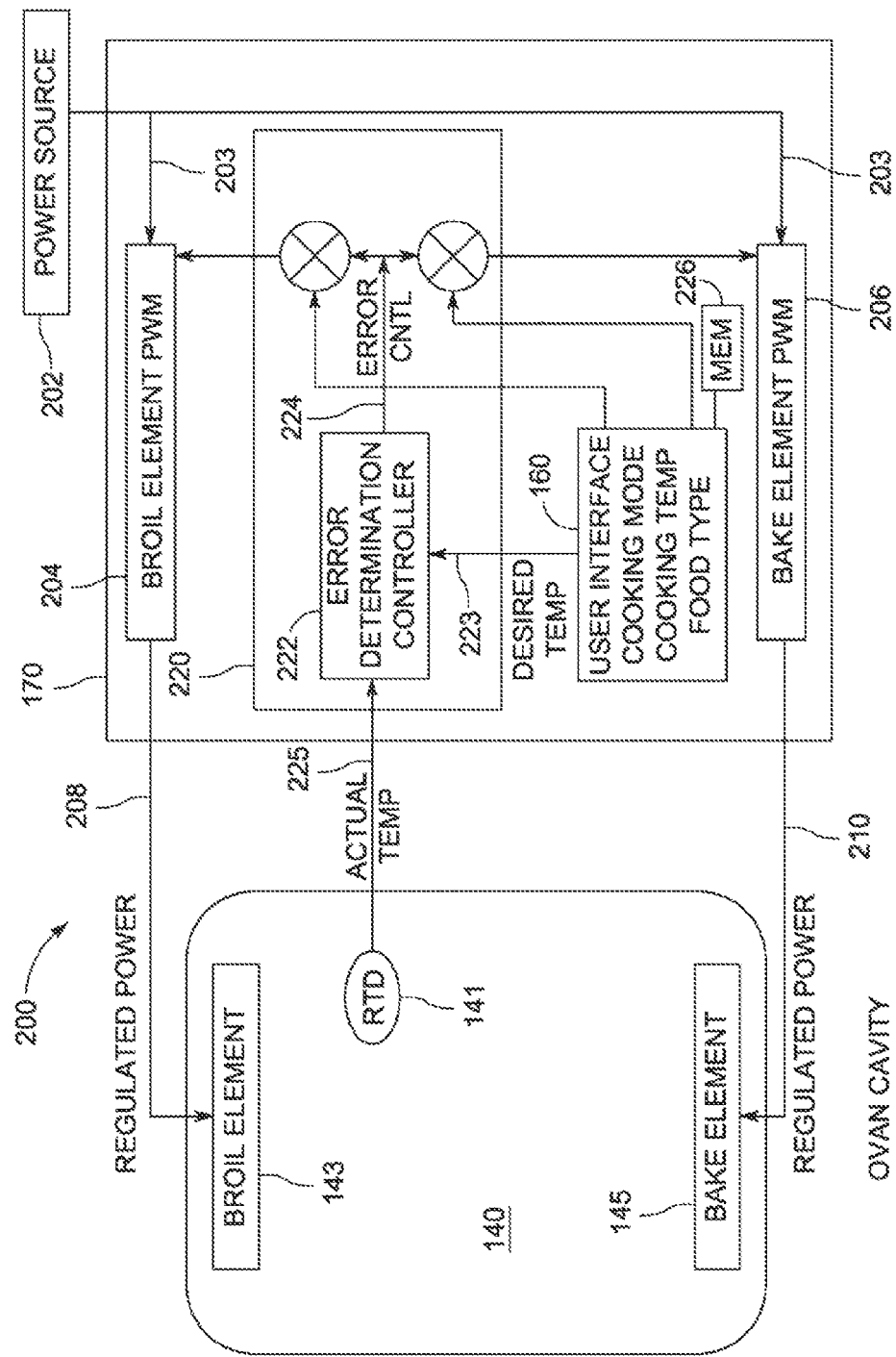
FIG. 2 provides a schematic view of certain components of the exemplary range appliance of FIG. 1.

FIG. 2 provides a schematic view of certain components of range appliance 100, including an oven temperature control system 200. As may be seen in FIG. 2, oven temperature control system 200 includes oven controller 170, which is operatively coupled to each of heating elements 143, 145. In one embodiment, the oven controller 170 is coupled to each heating element 143, 145 through a respective power regulating device 204, 206, respectively. Each power regulating device 204, 206, also referred to as a Broil Element PWM and Bake Element PWM, respectively, provide regulated power 208, 210 from power source 202 to each of heating elements 143, 145, respectively. In one embodiment, power regulating devices 204, 206 comprise TRIAC type or relay type devices that are configured to block/pass the power signal from power supply 202 to their respective heating elements 143, 145. In alternate embodiments, power regulating devices 204, 206 can include any suitable power regulating device, such as for example, a solid state electronic device, a diode for alternating current device (DIAC), silicon controlled rectifier device (SCR) or insulated gate bipolar transistor (IGBT) type device.

In accordance with the aspects of the disclosed exemplary embodiments, power regulating devices 204, 206 duty cycle control the supply of power to their respective heating elements 143, 145 from power source 202, also referred to as the AC supply or mains. The term "duty cycle control" refers generally to cycling power signal 203 from power source 202 ON/OFF at some rate (frequency=1/period). The duty cycle control generally determined the percentage or fraction of power from power source 202 that is supplied to each element 143, 145. This can be achieved, e.g., by "chopping" (phase controlling) the power signal, or pulse width modulating the signal (PWM) or cycle skipping.

Oven controller 170 includes a control module 220. In one embodiment, the control module 220 includes an error determination control module or controller 222. The error determination control module 222 is operatively coupled to the temperature sensor 141 and the user interface or control panel 160 and is configured to receive a desired temperature signal 223 representative of the desired cooking temperature, also referred to herein as the temperature set point, as well as an actual temperature signal 225 representative of the temperature of or within cavity 140. In one exemplary embodiment, temperature set point 223 is set using control knob 162 on control panel 160, and temperature sensor 141, which in this example comprises a resistance temperature detector (RTD) sensor, provides the actual temperature signal 225. In alternate exemplary embodiments, the temperature sensor 141 can include any suitable temperature sensor, such as a thermistor, thermocouple, or integrated circuit. Error determination control module 222 is generally configured to calculate the difference or error between desired temperature signal 223 and actual temperature 225 and generate an error control signal 224. In one exemplary embodiment, the error determination control module 222 is a proportional integral (PI) type control, configured to generate the error control signal 224 based on a sum of the error (difference between desired and sensed temperature) and the integral of the error, each multiplied by their respective control coefficients. This configuration provides a good balance between accuracy and processor capacity requirements.

Alternatively, for tighter control of the temperature, control module 222 may be configured as a proportional integral differential (PID) control by also including in the sum, the derivative of the error multiplied by its control coefficient. In an alternative exemplary embodiment requiring the least computing resources, control module 222 may be configured as a proportional (P) control configured to generate an error signal based on the difference between the sensed temperature and the desired temperature. In each of these embodiments, the control coefficients are empirically determined to provide the desired performance for the oven to be controlled, as each oven design or operating environment will have its own particular thermal characteristics. Error control signal 224 of error determination control module 222 is used by each power regulating device 204, 206, to regulate the duty cycle of power signal 203 from power source 202 to heating elements 143, 145. In alternate embodiments, error control signal 224 may be calculated or determined using any suitable logic control system, including, but not limited to P, PI, PID or fuzzy logic control based systems.

The cooking modes of oven portion 130 may include a bake mode, a broil mode, a convection bake mode, a multi-bake mode and/or a warming mode. In one embodiment, the baking mode may include 1-rack, multi-rack and convection style baking. The cooking temperature is generally set by the user according to the desired temperature at which the food is to be cooked. In certain systems, the type of food being cooked can be identified and selected via control panel 160. The types of food that can be designated can include for example, baked goods, meats, pizzas and frozen food items. In alternate embodiments, any food that is suitable for heating or cooking in an oven can be contemplated. In one embodiment, oven controller 170 can include a pre-determined or stored cooking algorithm for specific types of foods, such as for example, meats, breads and baked goods.

Figure 3:
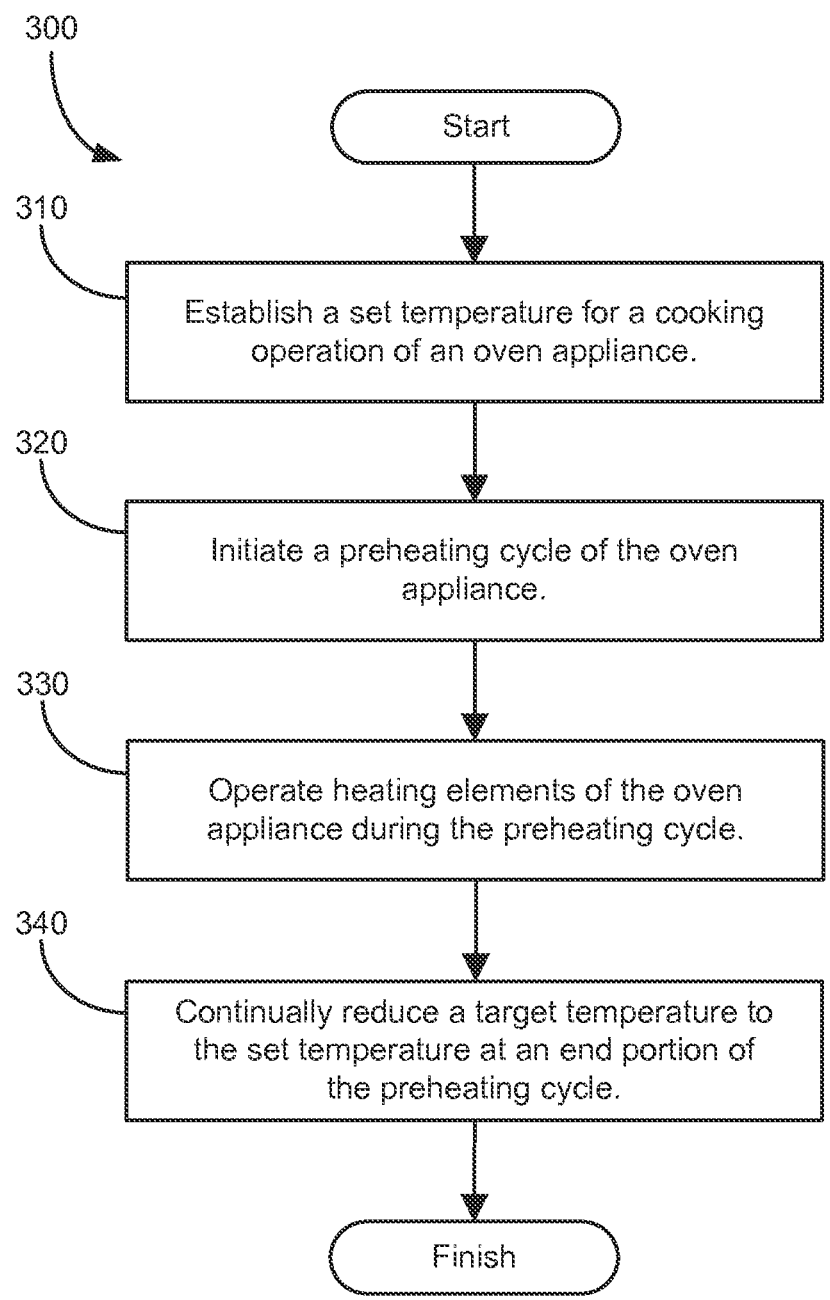
FIG. 3 illustrates a method for operating an oven appliance according to an exemplary embodiment of the present subject matter.
Figure 4:
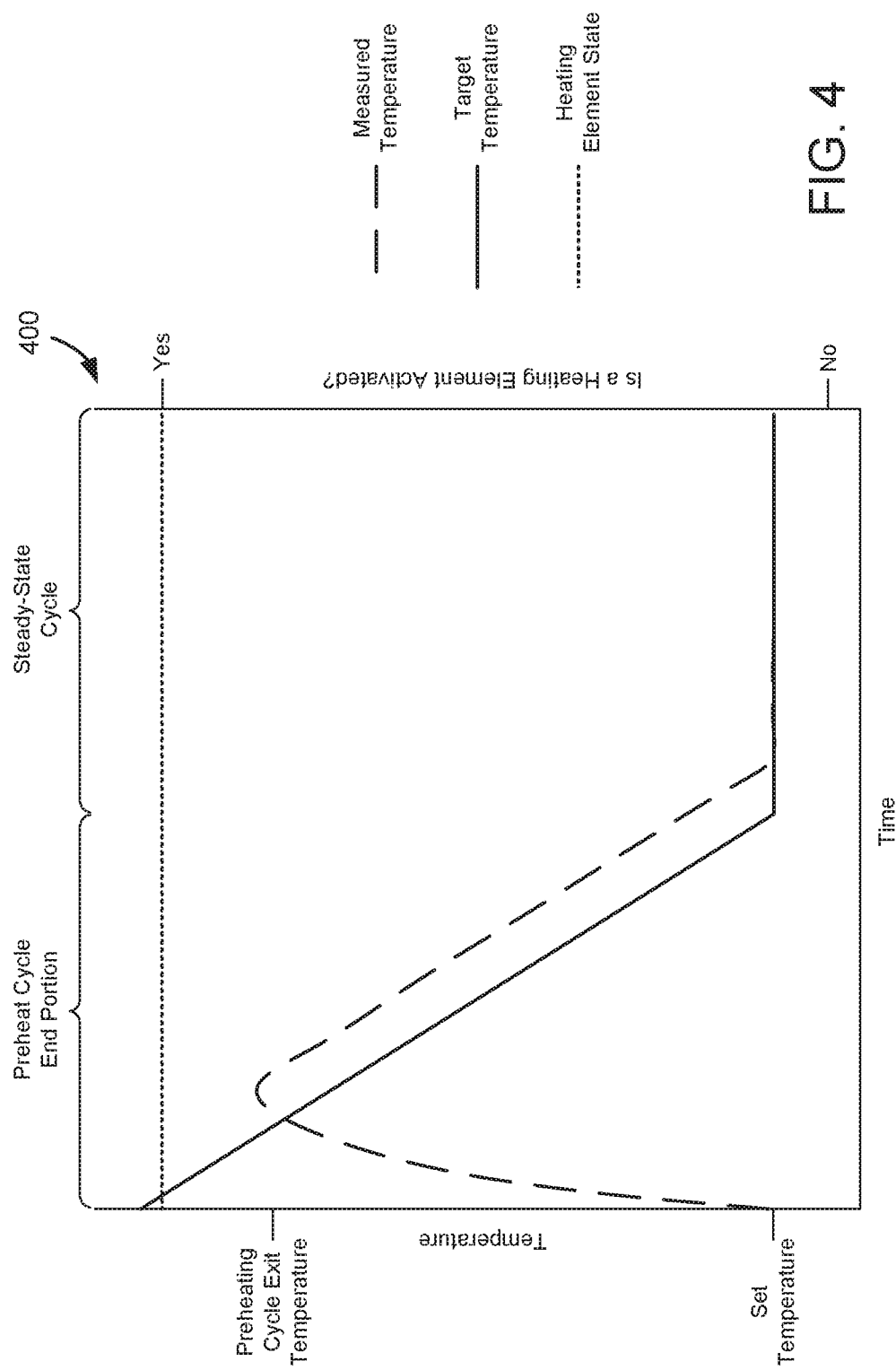
FIG. 4 provides an exemplary plot of a measured temperature within a cooking chamber of an oven appliance versus time, a target temperature for the oven appliance versus time and an operating condition of a heating element of the oven appliance versus time according to an exemplary aspect of the present subject matter.

FIG. 3 illustrates a method 300 for operating an oven appliance according to an exemplary embodiment of the present subject matter. Method 300 may be used to operate any suitable oven appliance. For example, method 300 may be used to operate range appliance 100 (FIG. 1). In particular, oven temperature control system 200 (FIG. 2) of range appliance 100 may be programmed or configured to implement method 300. Utilizing method 300, a cooking performance of range appliance 100 can be improved. In particular, a cooking performance of range appliance 100 immediately after or at an end of a preheating cycle of range appliance 100 can be improved. FIG. 4 provides an exemplary plot 400 of a measured temperature within cavity 140 of range appliance 100 versus time, a target temperature for range appliance 100 versus time and an operating condition of at least one of heating elements 143, 145 of range appliance 100 versus time according to an exemplary aspect of the present subject matter. Method 400 is described in greater detail below with reference to FIGS. 3 and 4.

At step 310, a set temperature for a cooking operation of range appliance 100 is established. The set temperature for a cooking operation of range appliance 100 may correspond to a desired steady-state operating temperature for the cooking operation of range appliance 100. As an example, a user of range appliance 100 may utilize control panel 160 to generate desired temperature signal 223, with desired temperature signal 223 corresponding to the set temperature for the cooking operation of range appliance 100, at step 310. Thus, the user of range appliance 100 may select or choose the set temperature for the cooking operation of range appliance 100 at step 310. The desired temperature signal 223 may also be transmitted or sent to oven controller 170 at step 310.

At step 320, a preheating cycle of range appliance 100 is initiated. As an example, oven controller 170 may initiate the preheating cycle of range appliance 100 at step 320 in response to the user of range appliance 100 selecting the set temperature for the cooking operation of range appliance 100 at step 310. During the preheating cycle, oven controller 170 may activate at least one of heating elements 143, 145 within cavity 140 in order to increase the temperature of cavity 140 and walls 142, 144, 146, 148 of cavity 140 at step 330. Thus, during the preheating cycle, the actual temperature signal 225 from temperature sensor 141 may increase and/or approach the set temperature over time as may be seen in FIG. 4. Oven controller 170 may monitor the actual temperature signal 225 from temperature sensor 141 during the preheating cycle in order to regulate the temperature within cavity 140.

During step 330, oven controller 170 may operate at least one of heating elements 143, 145 in order to heat cavity 140 as may be seen in FIG. 4. In particular, oven controller 170 may operate at least one of heating elements 143, 145 in order to heat cavity 140 to a target temperature with heating elements 143, 145. The target temperature may correspond to an operating temperature for heating elements 143, 145 during the preheating cycle such that oven controller 170 operates heating elements 143, 145 to heat cavity 140 to the target temperature during the preheating cycle. The target temperature may be greater than the set temperature at a start of the preheating cycle. For example, the target temperature may be at least ten degrees Celsius greater than the set temperature at the start of the preheating cycle.

At step 340, the target temperature is continually or continuously reduced to the set temperature at an end portion of the preheating cycle. As an example, oven controller 170 may continually reduce the target temperature to the set temperature over a period of time at the end portion of the preheating cycle. The period of time may be any suitable period of time. For example, the period of time may be five minutes, ten minutes, fifteen minutes, etc. In FIG. 4, the end portion of the preheat cycle and a beginning portion of a steady-state cooking cycle are shown.

Oven controller 170 may monitor the actual temperature signal 225 from temperature sensor 141 during step 330 and may begin continually reducing the target temperature to the set temperature when the actual temperature signal 225 from temperature sensor 141 meets or exceeds a preheating cycle exit temperature. The preheating cycle exit temperature may be determined or established (e.g., empirically) based at least in part on the set temperature and/or characteristics of range appliance 100, as will be understood by those skilled in the art, and may correspond to a temperature of cavity 140 at which cavity 140 is suitably preheated. The preheating cycle exit temperature may be less than the target temperature at step 340. As may be seen in FIG. 4, oven controller 170 may linearly reduce the target temperature to the set temperature at the end portion of the preheating cycle. In certain exemplary embodiments, the target temperature may be greater than the set temperature during the entirety of the preheating cycle.

As the target temperature decreases during step 340, a, e.g., average, power output of at least one of heating elements 143, 145 may also decrease, e.g., due to oven controller 170 changing or adjusting a duty cycle of heating elements 143, 145. Thus, the actual temperature signal 225 from temperature sensor 141 may decrease or begin degreasing during step 340 as shown in FIG. 4. However, as shown in FIG. 4, the actual temperature signal 225 from temperature sensor 141 may not drop below the set temperature during the preheating cycle. Thus, the target temperature may be continually reduced to the set temperature at the end portion of the preheating cycle at step 340 such that the actual temperature signal 225 from temperature sensor 141 does not drop below the set temperature during the preheating cycle.

Utilizing method 300, the target temperature is adjusted, e.g., over a given time period at a given duty cycle, to the set temperature. In addition, as may be seen in FIG. 4, at least one of heating elements 143, 145 is activated or operated during the preheating cycle. Thus, heating elements 143, 145 drive heat into cavity 140 during all or substantially all of the preheating cycle. In such a manner, the end portion of the preheating cycle may provide a suitable cooking temperature profile for food items within cavity 140 while also providing energy input to the food items within cavity 140 at the start of the steady-state cooking cycle. Thus, short bake foods that are cooked at the start of the steady-state cooking cycle may have decreased cook times and improved cooking uniformity and performance.

Figure 5:
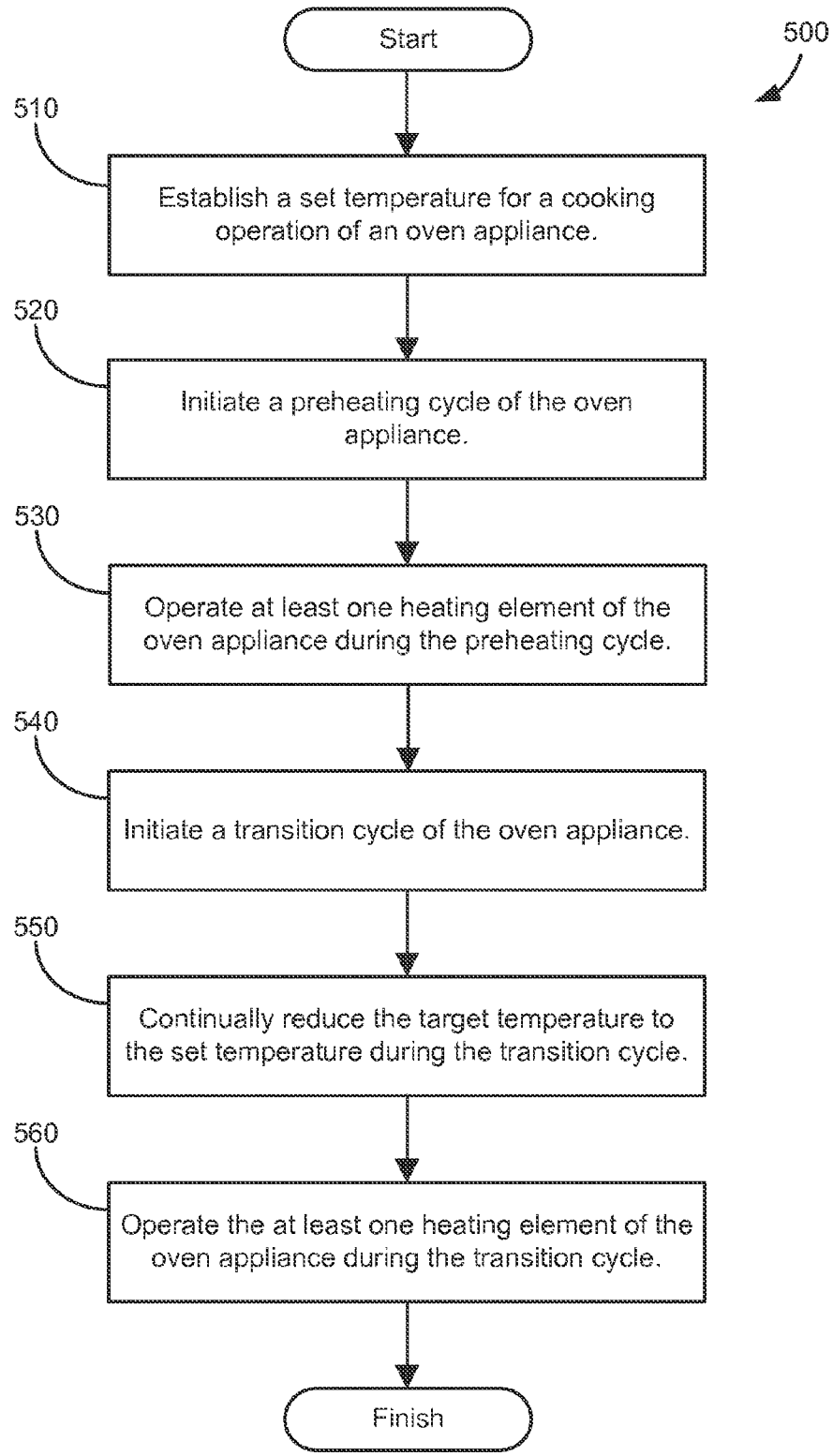
FIG. 5 illustrates a method for operating an oven appliance according to another exemplary embodiment of the present subject matter.
Figure 6:
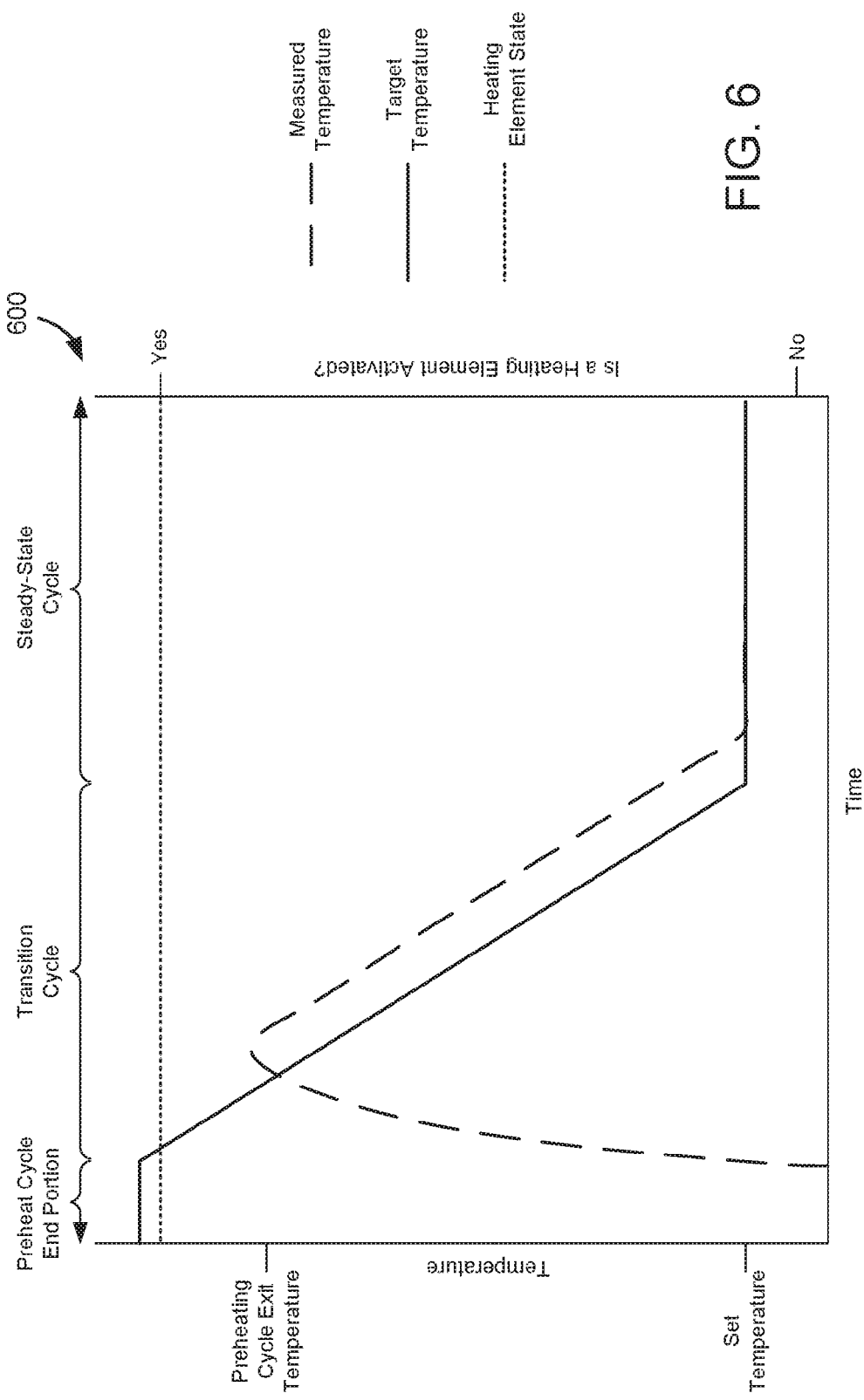
FIG. 6 provides an exemplary plot of a measured temperature within a cooking chamber of an oven appliance versus time, a target temperature for the oven appliance versus time and an operating condition of a heating element of the oven appliance versus time according to another exemplary aspect of the present subject matter.

FIG. 5 illustrates a method 500 for operating an oven appliance according to another exemplary embodiment of the present subject matter. Method 500 may be used to operate any suitable oven appliance. For example, method 500 may be used to operate range appliance 100 (FIG. 1). In particular, oven temperature control system 200 (FIG. 2) of range appliance 100 may be programmed or configured to implement method 500. Utilizing method 500, a cooking performance of range appliance 100 can be improved. In particular, a cooking performance of range appliance 100 immediately after or at an end of a preheating cycle of range appliance 100 can be improved. FIG. 6 provides an exemplary plot 600 of a measured temperature within cavity 140 of range appliance 100 versus time, a target temperature for range appliance 100 versus time and an operating condition of at least one of heating elements 143, 145 of range appliance 100 versus time according to another exemplary aspect of the present subject matter. Method 500 is described in greater detail below with reference to FIGS. 5 and 6.

At step 510, a set temperature for a cooking operation of range appliance 100 is established. The set temperature for a cooking operation of range appliance 100 may correspond to a desired steady-state operating temperature for the cooking operation of range appliance 100. As an example, a user of range appliance 100 may utilize control panel 160 to generate desired temperature signal 223, with desired temperature signal 223 corresponding to the set temperature for the cooking operation of range appliance 100, at step 510. Thus, the user of range appliance 100 may select or choose the set temperature for the cooking operation of range appliance 100 at step 510. The desired temperature signal 223 may also be transmitted or sent to oven controller 170 at step 510.

At step 520, a preheating cycle of range appliance 100 is initiated. As an example, oven controller 170 may initiate the preheating cycle of range appliance 100 at step 520 in response to the user of range appliance 100 selecting the set temperature for the cooking operation of range appliance 100 at step 510. During the preheating cycle, oven controller 170 may activate at least one of heating elements 143, 145 within cavity 140 in order to increase the temperature of cavity 140 and walls 142, 144, 146, 148 of cavity 140 at step 530. Thus, during the preheating cycle, the actual temperature signal 225 from temperature sensor 141 may increase over time as may be seen in FIG. 5. Oven controller 170 may monitor the actual temperature signal 225 from temperature sensor 141 during the preheating cycle in order to regulate the temperature within cavity 140.

During step 530, oven controller 170 may operate at least one of heating elements 143, 145 in order to heat cavity 140 as may be seen in FIG. 6. In particular, oven controller 170 may operate at least one of heating elements 143, 145 in order to heat cavity 140 to a target temperature with heating elements 143, 145. The target temperature may correspond to an operating temperature for heating elements 143, 145 during the preheating cycle such that oven controller 170 operates heating elements 143, 145 to heat cavity 140 to the target temperature during the preheating cycle. The target temperature may be greater than the set temperature during the preheating cycle. For example, the target temperature may be at least ten degrees Celsius greater than the set temperature during the preheating cycle. The target temperature may also be, e.g., substantially, constant during the preheating cycle as shown in FIG. 6. For example, the target temperature may vary by less than ten percent, less than five percent or less than three percent during the preheating cycle.

At step 540, a transition cycle of range appliance 100 is initiated. As an example, oven controller 170 may shift to range appliance 100 from the preheating cycle to the transition cycle as shown in FIG. 6 at step 540, e.g., when a difference between the actual temperature signal 225 from temperature sensor 141 and the target temperature or the set temperature reaches a predetermined difference. As another example, oven controller 170 may monitor the actual temperature signal 225 from temperature sensor 141 during step 530 and may initiate the transition cycle of range appliance 100 when the actual temperature signal 225 from temperature sensor 141 meets or exceeds a preheating cycle exit temperature. The preheating cycle exit temperature may be (e.g., empirically) determined or established based at least in part on the set temperature and/or characteristics of range appliance 100, as will be understood by those skilled in the art, and may correspond to a temperature of cavity 140 at which cavity 140 is suitably preheated. The preheating cycle exit temperature may be less than the target temperature at step 540, as may be seen in FIG. 6. The transition cycle adjusts range appliance 100 from the preheating cycle to the steady-state cycle.

At step 550, the target temperature is continually or continuously reduced to the set temperature during the transition cycle. As an example, oven controller 170 may continually reduce the target temperature to the set temperature over a period of time during the transition cycle. The period of time may be any suitable period of time. For example, the period of time may be five minutes, ten minutes, fifteen minutes, etc. As may be seen in FIG. 6, oven controller 170 may linearly reduce the target temperature to the set temperature during the transition cycle. In certain exemplary embodiments, the target temperature may be greater than the set temperature during the entirety of the transition cycle.

At step 560, at least one of heating elements 143, 145 is operated during the transition cycle in order to heat cavity 140 as may be seen in FIG. 6. In particular, oven controller 170 may operate at least one of heating elements 143, 145 in order to heat cavity 140 to the target temperature with heating elements 143, 145. As the target temperature decreases during the transition cycle, a, e.g., average, power output of at least one of heating elements 143, 145 may also decrease, e.g., due to oven controller 170 changing or adjusting a duty cycle of heating elements 143, 145. Thus, as shown in FIG. 6, the actual temperature signal 225 from temperature sensor 141 may decrease or begin to decrease during step 340 and the transition cycle. However, as shown in FIG. 6, the actual temperature signal 225 from temperature sensor 141 may not drop below the set temperature during the transition cycle. Thus, the target temperature may be continually reduced to the set temperature during the transition cycle at step 550 such that the actual temperature signal 225 from temperature sensor 141 does not drop below the set temperature during the transition cycle.

Utilizing method 500, the target temperature is adjusted, e.g., over a given time period at a given duty cycle, to the set temperature. In addition, as may be seen in FIG. 6, at least one of heating elements 143, 145 is activated or operated during the preheating cycle. Thus, heating elements 143, 145 drive heat into cavity 140 during all of the preheating cycle and/or the transition cycle. In such a manner, the end portion of the preheat cycle and the transition cycle may provide a suitable cooking temperature profile for food items within cavity 140 while also providing energy input to the food items within cavity 140 at the start of the steady-state cooking cycle. Thus, short bake foods that are cooked at the start of the steady-state cooking cycle may have decreased cook times and improved cooking uniformity and performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an oven appliance, comprising:
    establishing a set temperature for a cooking operation of the oven appliance;
    determining a preheating cycle exit temperature for the cooking operation of the oven appliance based at least in part on the set temperature;
    initiating a preheating cycle of the oven appliance;
    operating heating elements of the oven appliance during the preheating cycle in order to heat a cooking chamber of the oven appliance to the preheating cycle exit temperature with the heating elements, the preheating cycle exit temperature being greater than the set temperature; and
    continually linearly reducing a target temperature of the oven appliance to the set temperature over a period of time after a temperature of the cooking chamber exceeds the preheating cycle exit temperature, the target temperature corresponding to an operating temperature for the heating elements such that a controller of the oven appliance operates the heating elements to heat the cooking chamber to the target temperature,
    wherein at least one heating element of the heating elements of the oven appliance is activated and supplied with electrical power or gaseous fuel to drive heat into the cooking chamber during said step of continually linearly reducing.

2. The method of claim 1, wherein the period of time is at least ten minutes.

3. The method of claim 1, wherein the temperature of the cooking chamber of the oven appliance does not drop below the set temperature during said step of continually reducing.

4. The method of claim 1, wherein the target temperature is at least ten degrees Celsius greater than the set temperature at a start of the preheating cycle.

5. The method of claim 1, wherein the heating elements of the oven appliance heat the cooking chamber of the oven appliance during all of the preheating cycle.

6. The method of claim 1, further comprising decreasing an average power output of at least one of the heating elements of the oven appliance during said step of continually linearly reducing.

\* \* \* \* \*